United States Patent [19]
Christensen

[11] Patent Number: 5,143,516
[45] Date of Patent: Sep. 1, 1992

[54] RECIRCULATION SHIELD AND FAN SHROUD ASSEMBLY

[75] Inventor: Steven Christensen, Livermore, Calif.

[73] Assignee: Paccar Inc., Bellevue, Wash.

[21] Appl. No.: 716,770

[22] Filed: Jun. 18, 1991

Related U.S. Application Data

[63] Continuation of Ser. No. 306,982, Feb. 6, 1989, abandoned.

[51] Int. Cl.⁵ .................................................. F01P 5/06
[52] U.S. Cl. ............................. 415/182.1; 416/169 A; 123/41.44; 180/68.1
[58] Field of Search ................ 416/169 A; 415/213.1, 415/214.1, 220, 182.1; 123/41.44, 41.48, 41.49, 41.55, 41.7; 180/68.1, 68.3, 68.4

[56] References Cited

U.S. PATENT DOCUMENTS

| | | | |
|---|---|---|---|
| 3,872,916 | 3/1975 | Beck | 415/222 |
| 3,937,189 | 2/1976 | Beck | 415/222 |
| 4,397,348 | 8/1983 | Klem | 165/41 |
| 4,548,548 | 10/1985 | Gray, III | 415/210.1 |
| 4,590,889 | 5/1986 | Hiereth | 416/169 A |

FOREIGN PATENT DOCUMENTS

| | | | |
|---|---|---|---|
| 2504140 | 8/1975 | Fed. Rep. of Germany | 416/169 A |
| 85/02889 | 7/1985 | PCT Int'l Appl. | 416/169 A |

Primary Examiner—John T. Kwon
Attorney, Agent, or Firm—Flehr, Hohbach, Test, Albritton & Herbert

[57] ABSTRACT

A recirculation shield and engine fan shroud assembly. The apparatus includes a shroud assembly mounted to the radiator. The shroud is configured so as to conform with and seal the interior of the engine compartment around the radiator such that substantially all the air entering the engine compartment is of ambient temperature free from recirculation of hot fan discharge airflow.

2 Claims, 4 Drawing Sheets

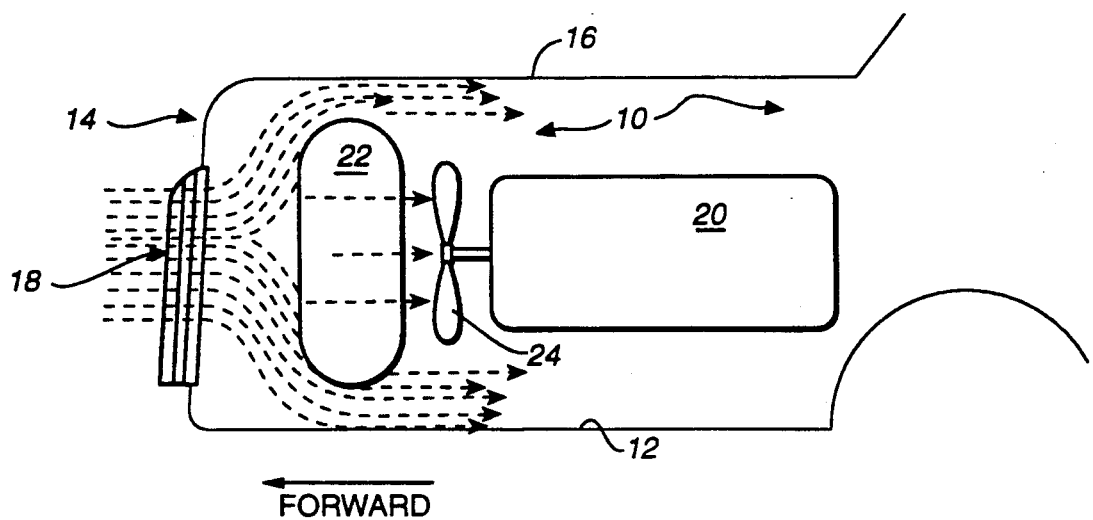
FIG._1
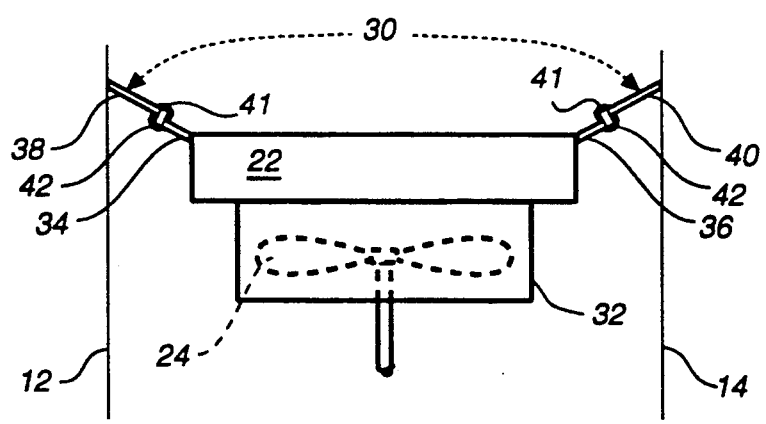
FIG._2
(PRIOR ART)

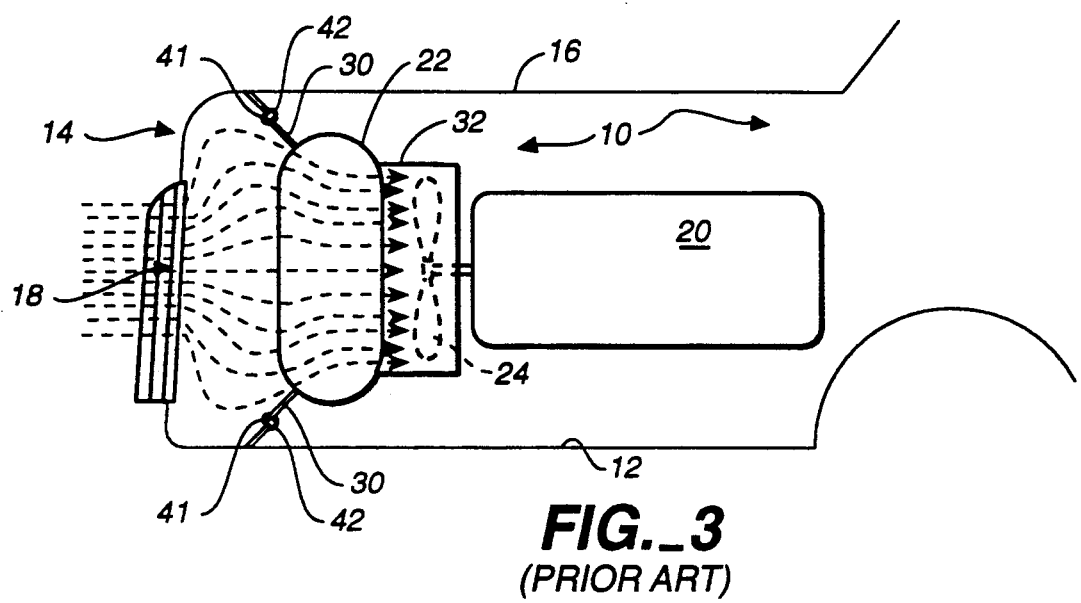
FIG._3
(PRIOR ART)
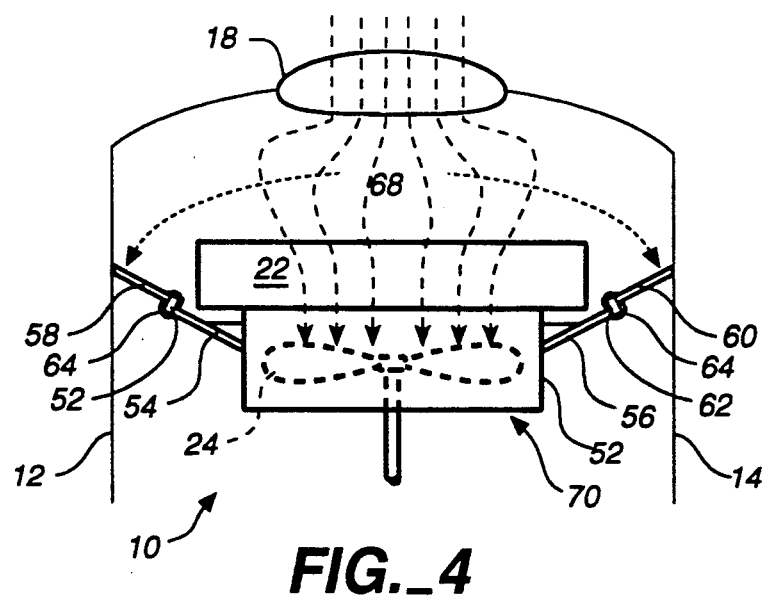
FIG._4

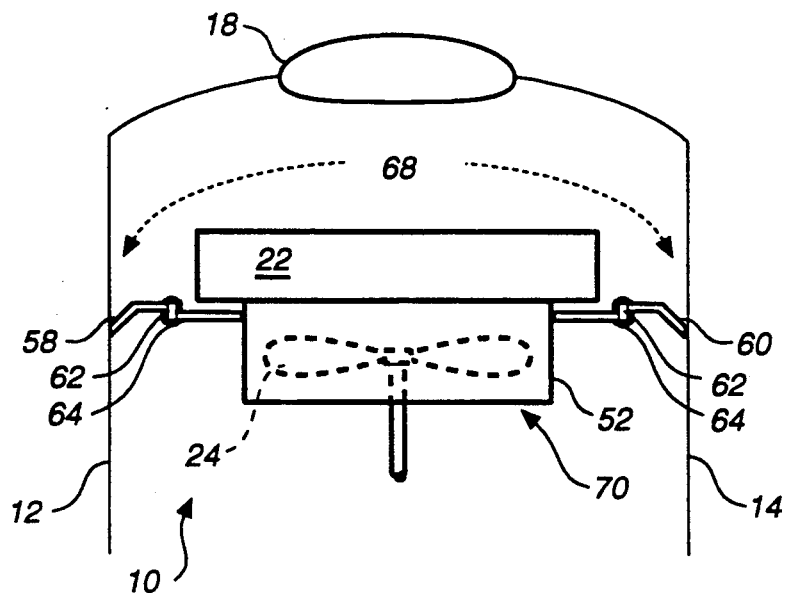
FIG._5
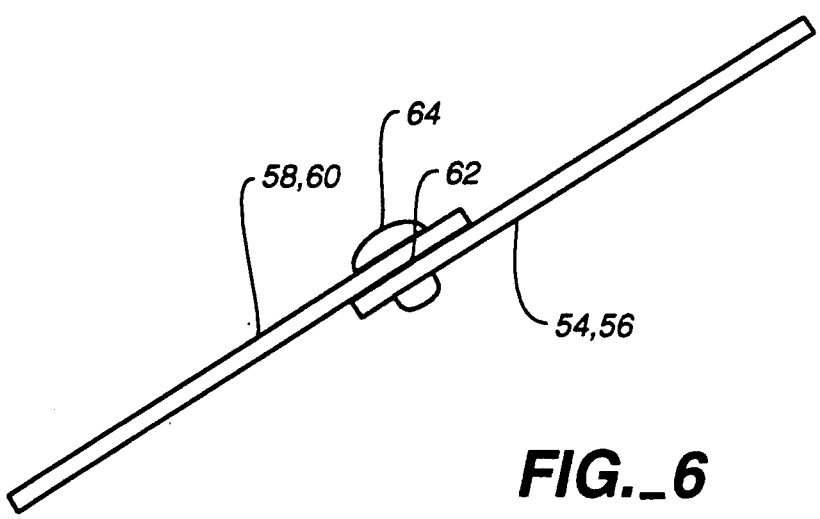
FIG._6

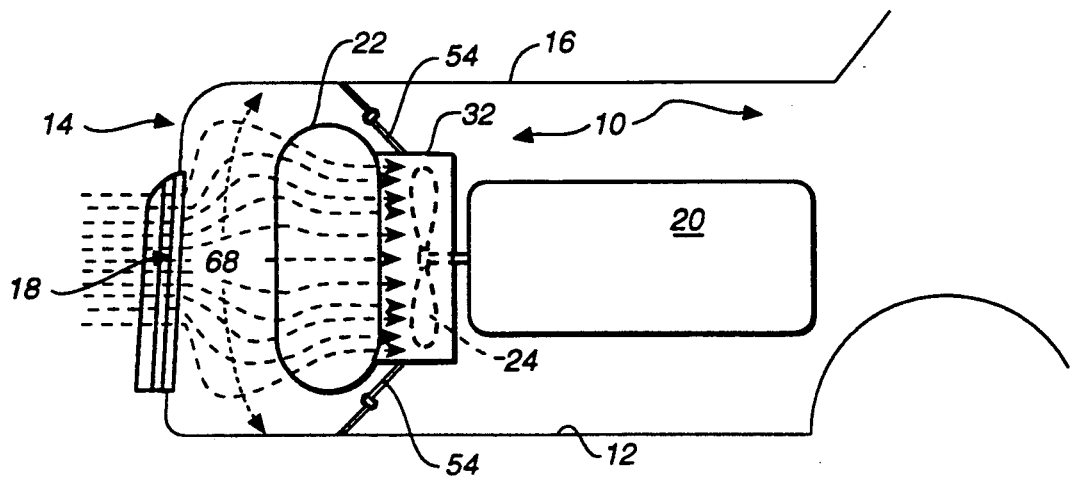
FIG._7
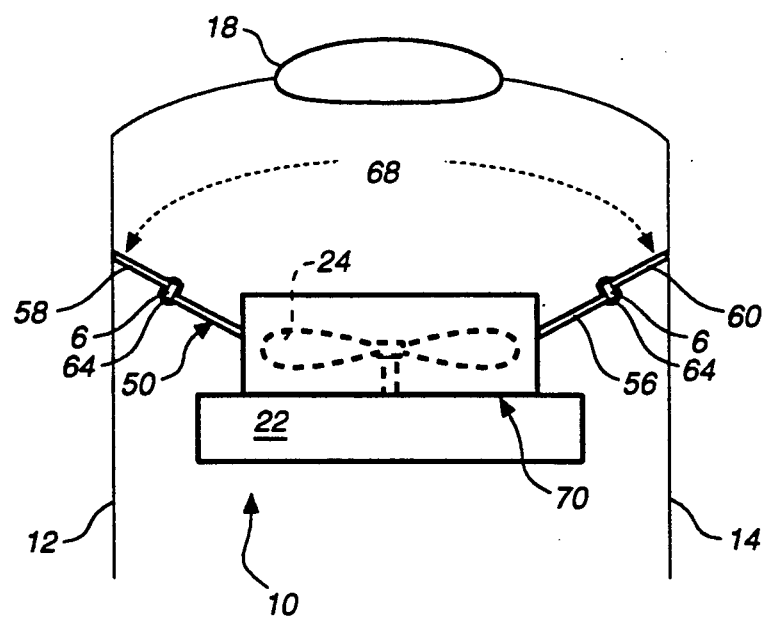
FIG._8

RECIRCULATION SHIELD AND FAN SHROUD ASSEMBLY

This is a continuation of application Ser. No. 07/306,982 filed Feb. 6, 1989 now abandoned.

The present invention relates generally to an improved recirculation shield and engine fan shroud arrangement to control airflow entering the engine compartment of a motorized vehicle through the radiator and engine fan. More particularly, the invention relates to a recirculation shield and fan shroud assembly mounted to the radiator and configured so as to conform with and seal to the interior walls of the engine compartment around the radiator to prevent hot fan discharge air flow from recirculating from behind the radiator and mixing with the ambient cooling air flow entering the engine compartment through the radiator and engine fan.

BACKGROUND OF THE INVENTION

Prior art recirculation shields and fan shrouds are two distinct apparatuses. Current recirculation shields used in motorized vehicles generally include a plurality of brackets which are bolted to the side members of the radiator. The brackets are positioned to extend laterally outward from the radiator toward the interior walls of the engine compartment. Rubber recirculation seals extend from the brackets outward toward the interior walls of the engine compartment. Self tapping screws, rivets, or similar means are used to fasten the shield brackets and the corresponding recirculation seals together at a common point where the shield brackets and recirculation seals meet. The shield brackets and the recirculation seals jointly form a recirculation shield to stop recirculation of hot fan discharge airflow around from behind the radiator and maintain cooling system airflow at ambient temperature.

A separate fan shroud is mounted to the back side of the radiator. The shroud fits circumferentially around the engine fan and is adapted to funnel airflow through the radiator and engine fan. When the fan rotates, air is drawn through the radiator thereby effectuating cooling of the engine.

There are several problems associated with the prior art. The recirculation shield and separate fan shroud require two distinct installation steps. First, each shield bracket must have the rubber recirculation seal attached, and then be individually bolted to a sidemember of the radiator. In a second installation step, the fan shroud must be bolted to the radiator. Furthermore, current recirculation shields are made of metallic brackets, which tend to be expensive. Metal brackets are subject to corrosion and metal fatigue and, therefore, have a limited useful life span.

SUMMARY OF THE INVENTION

Accordingly, it is a primary object of the invention to provide a recirculation shield and engine fan shroud assembly for controlling airflow into an engine compartment through the radiator and engine fan by eliminating recirculation of hot fan discharge airflow around the radiator into the ambient temperature airflow to maximize engine cooling.

Another object of the invention is to provide a recirculation shield and engine fan shroud assembly configured so as to conform with and seal the interior of the engine compartment around the radiator such that substantially all the air entering the radiator is of ambient air temperature.

Another object of the invention is to provide a low cost, long lasting and easy to install recirculation shield and fan shroud assembly configured so as to conform with and seal to the engine compartment of any motorized vehicle so that substantially all the air entering the radiator is of ambient air temperature.

To achieve the foregoing and other objects and in accordance with the present invention, there is provided a recirculation shield and engine fan shroud assembly. The assembly includes a fan shroud portion mounted to the radiator and a recirculation shield portion attached to the fan shroud portion. The recirculation shield portion is configured so as to conform with and seal the interior of the engine compartment around the radiator to prevent hot air fan discharge flow from recirculating from behind the radiator and mixing with the ambient airflow such that substantially all the air entering the engine compartment is at surrounding ambient temperature. The shroud is circumferentially positioned around the engine fan and is adapted to funnel the air from the radiator through the engine fan.

BRIEF DESCRIPTION OF THE DRAWINGS

Additional objects and features of the invention will be more readily apparent from the following detailed description and appended claims when taken in conjunction with the drawings, in which:

FIG. 1 is a side view schematic indicating the natural air flow in a motorized vehicle engine compartment without a recirculation shield or a fan shroud with respect to the forward motion of the motorized vehicle indicated by a forward directional arrow.

FIG. 2 is a diagram showing a top view of the radiator and prior art recirculation shield and separate fan shroud in the engine compartment of the motorized vehicle shown in FIG. 1.

FIG. 3 is a diagram showing a side view of the prior art recirculation shield and an engine fan shroud installed in the engine compartment of vehicle shown in FIG. 1.

FIG. 4 is a top view of the present invention recirculation shield and engine fan shroud assembly installed in the engine compartment of the motorized vehicle of FIG. 4.

FIG. 5 is a top view of the recirculation shield and engine fan shroud assembly installed in the engine compartment of FIG. 4 according to a different embodiment of the present invention.

FIG. 6 is a blown up view showing the alignment and joining together of a shield brackets and a corresponding rubber recirculation seal according to the present invention.

FIG. 7 is a side view of the present invention recirculation shield and engine fan shroud assembly installed in the engine compartment of the motorized vehicle shown in FIG. 4.

FIG. 8 is a top view of another embodiment of the present invention showing the recirculation shield and engine fan shroud assembly installed in front of the radiator in the motorized vehicle shown in FIG. 4.

DESCRIPTION OF THE PREFERRED EMBODIMENT

Referring now to the drawings, and in particular FIG. 1, there is shown a truck or motorized vehicle moving in the forward direction as indicated by the directional arrow. Motorized vehicle engine compartment 10 includes two side fender walls 12 and 14. The side fender walls slope upward and over the engine 20 forming an engine tunnel 16. A grille 18 is centrally positioned at the front of the compartment 10. Grille 18 permits incoming air to pass into the engine compartment 10 when the motorized vehicle is moving in the forward direction or when the engine cooling fan is engaged with the vehicle stationary.

The engine 20 is mechanically positioned inside the engine compartment 10. Radiator 22 is mechanically positioned behind the grille 18 and in front of engine 20. An engine fan 24 is mechanically positioned behind the radiator 22 and in front of the engine 20.

During the forward motion of the motorized vehicle, or during stationary operation with the engine fan engaged, incoming ambient air passes through the grille 18 and into the engine compartment 10. It is a well-known principle that moving air tends to flow from regions of high pressure to regions of low pressure. The engine fan generates high pressure behind the radiator within the engine compartment 24. In conformity with this principle, a substantial portion of the hot air exiting the radiator tends to circulate around the radiator and back into the cooling airflow entering the radiator 22. This recirculating hot air mixes with ambient airflow raising the temperature of the radiator inlet airflow, causing reduced radiator performance.

Referring now to FIG. 2, there is shown a prior art recirculation shield 30 and a separate fan shroud 32 installed in the engine compartment 10 of FIG. 1. The recirculation shield 30 includes recirculation shield brackets 34 and 36 bolted to the front left and right sides respectively of radiator 22. Brackets 34 and 36 are arranged to extend laterally outward toward the interior fender side walls 12 and 14 respectively in the engine compartment 10. Rubber recirculation seals 38 and 40 extend outward from the shield brackets 34 and 36, respectively. The shield brackets 34 and 36 and rubber recirculation seals 38 and 40 meet at a common point 41 and seal against the interior of the fender or engine tunnel side walls 12 and 14. In another example of the prior art, brackets 34 and 36 may be bolted to the back left and right sides respectively of radiator 22.

Self tapping screws, rivets, or a like means 42 are used to secure the shield brackets 34 and 36 and the corresponding rubber recirculation seals 38 and 40 at common point 41. Together, the brackets 34 and 36 and the corresponding rubber recirculation seals 38 and 40 form recirculation shield 30. The recirculation shield 30 prevents hot fan discharge air from circulating around the radiator 22 and heating ambient cooling airflow. In another example of the prior art, brackets 34 and 36 may be bolted to the back left and right sides respectively of radiator 22.

Fan shroud 32 is bolted to the back side of radiator 22. The shroud 32 fits circumferentially around the engine fan 24 and is adapted to funnel the air through the radiator and engine fan 24. When fan 24 rotates, air is drawn through the radiator thereby effectuating cooling of the engine 20.

Referring now to FIG. 3, a side view of shield brackets 34 and 36, corresponding recirculation seals 38 and 40 and self tapping screws or rivets 42 are shown forming the recirculation shield 30 bolted to radiator 22. The separate fan shroud 32 is also shown positioned behind radiator 22. FIG. 3 best shows the air flow in engine compartment 10 utilizing the prior art recirculation shield 30 and separate fan shroud 32. The hot fan discharge airflow exists downward and to the rear of this engine compartment without recirculation of the hot fan discharge air into the ambient airflow.

Referring now to FIG. 4, an embodiment of the integral recirculation shield and fan shroud assembly 50 according to the present invention is shown. The fan shroud 52 portion of the integral recirculation shield and shroud assembly 50 is mechanically mounted or bolted to the radiator 22. The shield portion of the integral recirculation shield and shroud assembly 50 includes the left and right side brackets 54 and 56 which flange outward from fan shroud 52 toward interior side fenders 12 and 14 or engine tunnel walls 12 and 14 respectively and forward with respect to fan shroud 52. In a different embodiment, as shown in FIG. 5, side brackets 54 and 56 flange outward toward side fender or engine tunnel walls 12 and 14 and behind fan shroud 52 with respect to the front of the engine compartment 10.

Rubber recirculation seals 58 and 60 extend outward from the fan shroud recirculation brackets 54 and 56, respectively and seal against interior fender or engine tunnel walls 12 and 14, respectively, of engine compartment 10. The shield brackets 54 and 56 and the seal brackets 58 and 60 meet at a common point 62. In this configuration, the left and right brackets 54 and 56 are molded into, and are an integral part of the fan shroud portion 52. The fan shroud recirculation shield assembly 50 is made by mechanically attaching the rubber recirculation seals 58 and 60 to the rubber recirculation shield bracket portion molded to the fan shroud. Accordingly, separate recirculation shield brackets are not required.

As best shown in FIG. 6, self tapping screws or rivets 64 are used to fasten the fan shroud shield brackets 54 and 56 and the corresponding rubber recirculation seals 58 and 60 together at common point 62. The brackets 54 and 56 and the corresponding rubber recirculation seals 58 and 60 form the recirculation seal portion of the recirculation shield fan shroud assembly 50.

As best shown in FIG. 7, the recirculation seal portion of recirculation shield fan shroud assembly 50 forms a tight seal between the radiator assembly 22 and the fender or engine tunnel walls 12 and 14. The air intake 68 is maintained at ambient temperature with the absence of any hot fan discharge air recirculation. Hot fan discharge airflow exits downward and to the rear of the engine compartment 10.

The recirculation shield and shroud 50 also has a narrower air output 70 located behind the radiator 22 and air intake opening 68 with respect to the direction of the incoming air. The air output opening 70 is positioned circumferentially behind the engine fan 24 and is adapted to output the airflow funneled through shroud portion 52. An air intake force is created when fan 24 rotates sucking air through the radiator and narrower air output 70 thereby effectuating the cooling of engine 20.

In yet another embodiment of the present invention shown in FIG. 8, the recirculation shield and fan shroud assembly 50 is positioned in front of radiator 22 in the engine compartment 10.

The recirculation shield fan shroud 50 is made of a gas impermeable, sturdy, but flexible material. By way of example, in the embodiment chosen for purpose of illustration, the material chosen is plastic. Among other material constituents include, but are not limited to: rubber and fiberglass.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In an apparatus for directing the flow of air relative to a radiator and a fan of an internal combustion engine mounted in an engine compartment defined by opposed engine tunnel walls, said apparatus including a fan shroud mounted around said fan to enhance and direct the flow of air through said radiator, and a recirculation seal extending radially in said engine compartment from said radiator to said engine tunnel walls and preventing recirculation of air from said fan to a position in front of said radiator, the improvement in said apparatus comprising:

at least one rubber recirculation shield bracket molded integrally with said fan shroud and extending radially therefrom toward said engine tunnel walls;

at lease one recirculation seal being mounted to said shield bracket and radially outwardly cantilevered from said bracket to form, an airtight fan shroud assembly between said fan shroud and walls;

2. The apparatus of claim 1 wherein,
 said recirculation seal is provided by rubber flaps mechanically attached to said shield bracket.

* * * * *